(12) United States Patent
Yanagisawa et al.

(10) Patent No.: US 7,969,836 B2
(45) Date of Patent: Jun. 28, 2011

(54) OPTICAL PICKUP APPARATUS

(75) Inventors: Takuma Yanagisawa, Tsurugashima (JP); Masakazu Ogasawara, Tsurugashima (JP); Makoto Sato, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 183 days.

(21) Appl. No.: 12/521,959

(22) PCT Filed: Jan. 5, 2007

(86) PCT No.: PCT/JP2007/050036
§ 371 (c)(1),
(2), (4) Date: Jul. 1, 2009

(87) PCT Pub. No.: WO2008/081600
PCT Pub. Date: Jul. 10, 2008

(65) Prior Publication Data
US 2009/0310469 A1    Dec. 17, 2009

(51) Int. Cl.
*G11B 7/00* (2006.01)
(52) U.S. Cl. .................. 369/44.41; 369/53.28
(58) Field of Classification Search .......... None
See application file for complete search history.

(56) References Cited

U.S. PATENT DOCUMENTS
5,487,056 A * 1/1996 Wachi .................. 369/44.34

FOREIGN PATENT DOCUMENTS
JP          11-353666        12/1999
WO       2004/038708         5/2004

* cited by examiner

*Primary Examiner* — Paul Huber
(74) *Attorney, Agent, or Firm* — Drinker Biddle & Reath LLP

(57) ABSTRACT

An optical pickup apparatus reads an information signal recorded on a recording surface of an optical disk along a track by projecting a light beam. Said optical pickup apparatus has: an objective lens for converging said light beam onto said recording surface; an objective lens moving device for moving said objective lens in a radial direction of said optical disk; and a divisional photosensing device for receiving return light reflected by said optical disk, in a plurality of divided regions. Said divisional photosensing device has: a first divisional photosensing device for dividing a first region including both edge portions in said radial direction of said return light, in two divided areas in said radial direction; a second divisional photosensing device for receiving a second region including both edge portions in a direction which perpendicularly crosses said radial direction of said return light, in two divided areas in said radial direction; and a third divisional photosensing device for receiving a third region including an almost center portion of said return light, in two divided areas in said radial direction.

9 Claims, 9 Drawing Sheets

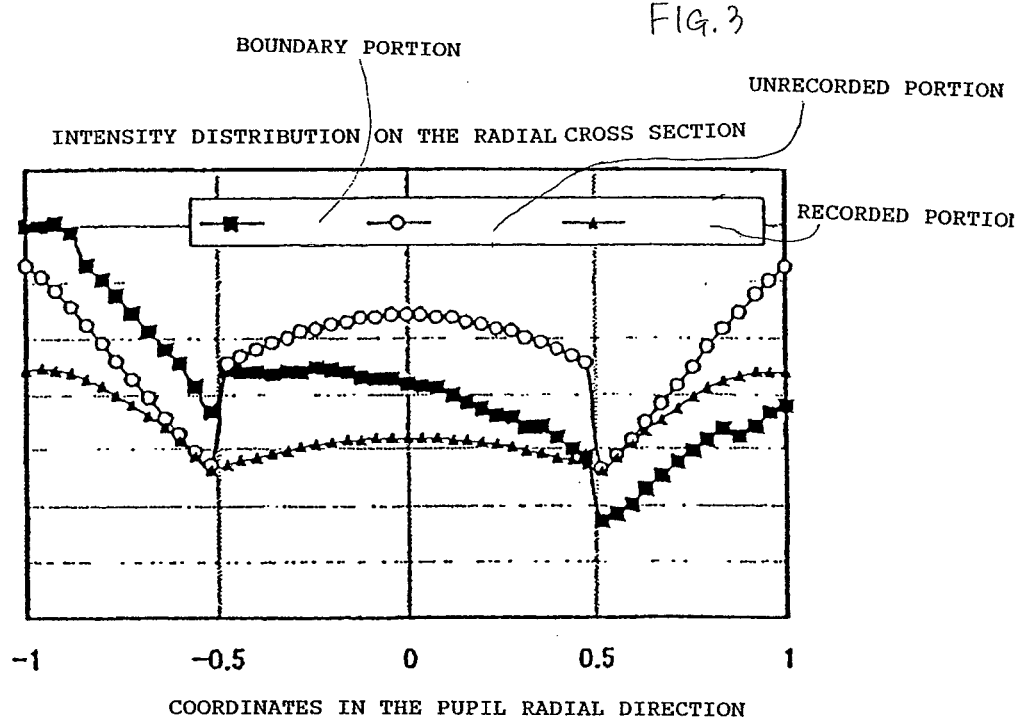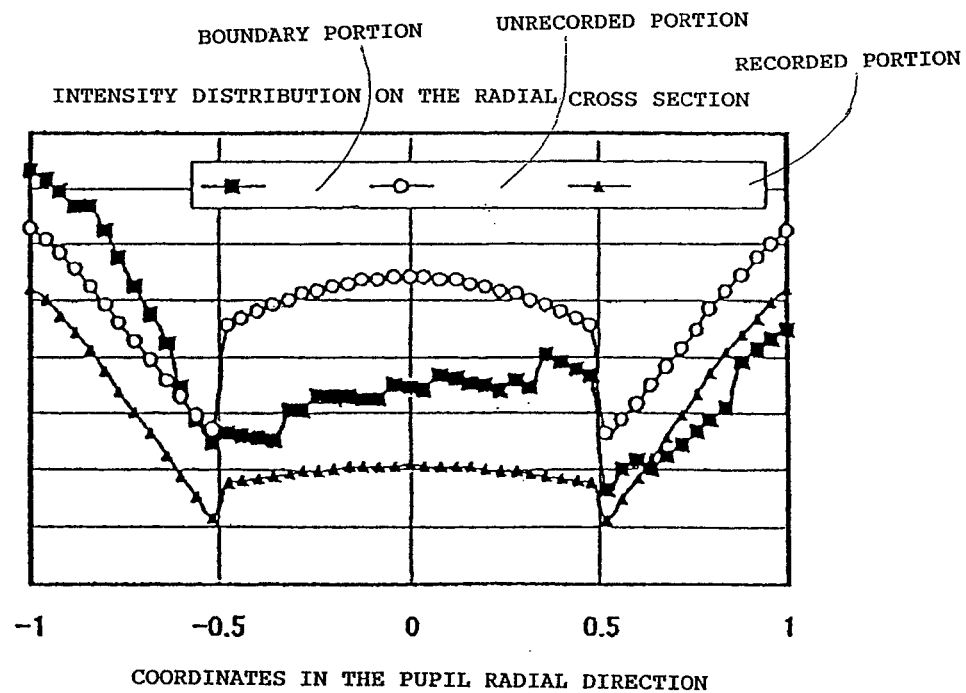
FIG. 3

FIG.4
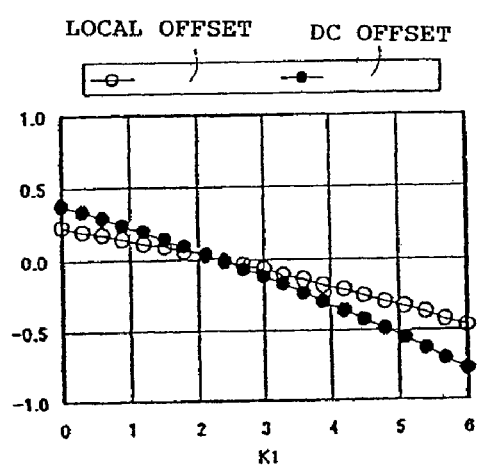
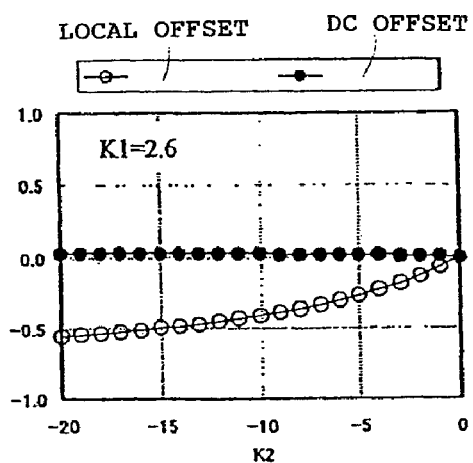
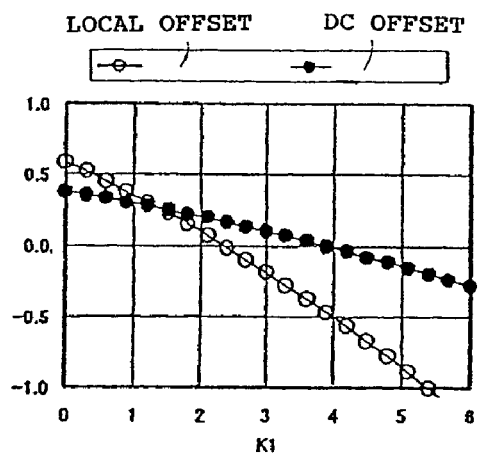
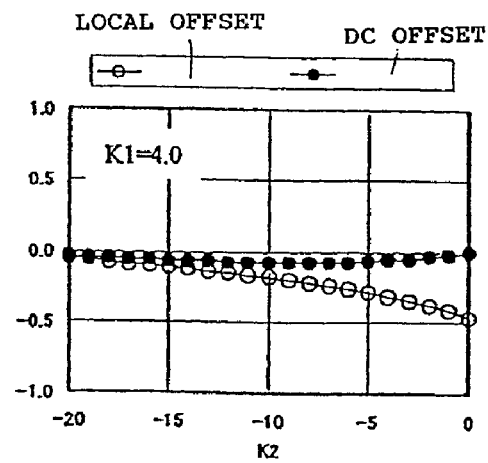

OPTICAL PICKUP APPARATUS

TECHNICAL FIELD

This application is a 371 of PCT/JP2007/050036, filed Jan. 5, 2007.

The invention relates to an optical pickup apparatus for reading information from a recording medium by projecting a light beam and, more particularly, to an optical pickup apparatus which can reduce an offset of a tracking error signal.

BACKGROUND ART

An optical pickup apparatus which is used in an optical recording medium such as BD (Blu-ray Disk) or DVD (Digital Versatile Disk) generally uses a push-pull method in order to produce a tracking error signal in a tracking servo control system. According to the method, generally, since only an objective lens is deflected in the direction which perpendicularly crosses an optical axis on the basis of the tracking error signal, there is such a problem that a DC offset is multiplexed to the tracking error signal.

There has been proposed, therefore, what is called an improved type push-pull method using a construction in which reflection light from the recording medium is received in a manner the light divided into a middle region and an edge region and a difference signal of photosensing elements for the middle region, that are arranged while being divided into two divided areas in a radial direction, is corrected by a difference signal of photosensing elements for the edge region, that are arranged while being divided into two divided areas in the radial direction (Japanese patent application No. 10-156039).

DISCLOSURE OF INVENTION

Although the DC offset can be reduced by the improved type push-pull method, there has been such a problem that the tracking servo control system becomes unstable when the projected beam is located in a boundary portion between a recorded region and an unrecorded region.

It is an objective of the invention to provide means for solving various problems including the foregoing problem as an example.

An optical pickup apparatus according to the invention is an optical pickup for reading an information signal recorded on a recording surface of an optical disk along a track by projecting a light beam, which comprises: an objective lens for converging said light beam onto said recording surface; an objective lens moving device for moving said objective lens in a radial direction of the optical disk; and a divisional photosensing device for receiving return light reflected by said optical disk, in a plurality of divided regions. Said divisional photosensing device comprises: a first divisional photosensing device for receiving a first region including both edge portions in said radial direction of said return light, in two divided areas in said radial direction; a second divisional photosensing device for receiving a second region including both edge portions in a direction which perpendicularly crosses said radial direction of said return light, in two divided areas in said radial direction; and a third divisional photosensing device for receiving a third region including an almost center portion of said return light, in two divided areas in said radial direction.

BRIEF DESCRIPTION OF DRAWINGS

FIG. 3 is a graph showing intensity distribution at a cross section of an objective lens of a light beam diffracted by an optical disk.

FIG. 4 is a graph each showing changes in a DC offset and a local offset to coefficients K1 and K2 in an arithmetic operating circuit in the embodiment of the invention.

MODE FOR CARRYING OUT THE INVENTION

An optical pickup apparatus according to the invention will be described hereinbelow with reference to the drawings.

Figure 1:
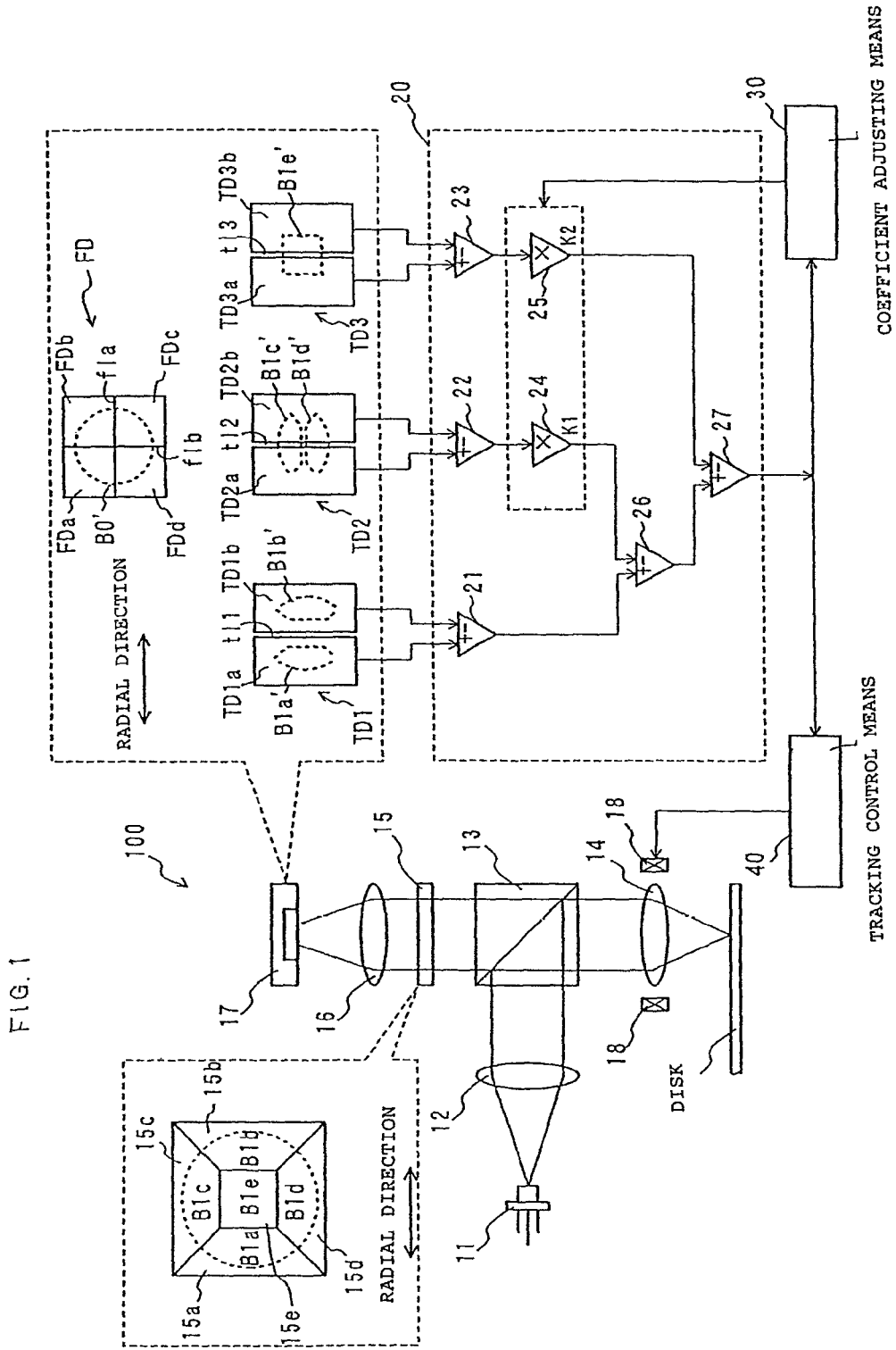
FIG. 1 is a block diagram showing a construction of an optical pickup apparatus of an embodiment of the invention.

The construction of the optical pickup apparatus as an embodiment of the invention is shown in FIG. 1. An optical pickup apparatus 100 includes a light source 11 such as a semiconductor laser for emitting a laser beam. A collimater lens 12 converts a light beam emitted from the light source 11 into parallel light. A beam splitter 13 reflects the light beam emitted from the collimater lens 12 at an angle of almost 90° and also transmits return light from an objective lens. An objective lens 14 converges the light beam which has been emitted from the beam splitter 13 and progresses toward a recording medium and also focuses the light beam which has been scattered/diffracted by a track or a recording mark on the recording medium. A hologram optical element (HOE element) 15 divides the light (return light) focused by the objective lens 14 into 0th order light and a plurality of first order light. A detecting lens 16 respectively focuses the 0th order light and the plurality of first order light caused by the HOE element 15 and applies astigmatism. A photodetector 17 receives the 0th order light and the plurality of first order light caused by the HOE element 15. In addition to an optical system of the above construction, the optical pickup apparatus 100 has: a first arithmetic operating circuit (not shown) for forming a read signal and a focusing error signal by arithmetically operating signals which are generated from the photodetector 17; and a second arithmetic operating circuit 20 for forming a tracking error signal by arithmetically operating the signals which are generated from the photodetector 17. The optical pickup apparatus 100 also has coefficient adjusting device or means 30 for adjusting coefficients which are used in the second arithmetic operating circuit 20. The optical pickup apparatus 100 further has: focusing control device or means (not shown) for controlling driving in a far/near direction of the objective lens 14 on the basis of the focusing error signal; and a tracking control device or means 40 for controlling driving in a parallel direction of the objective lens 14 on the basis of the tracking error signal. The optical pickup apparatus 100 also has: a tracking coil 18 for deflecting the objective lens 14 so as to traverse the tracking direction; and a focusing coil (not shown) for moving the objective lens in the far/near direction for the recording surface.

The structure of the HOE element 15 will be described in detail here. A plan view in the case where the HOE element 15 is seen from the incident side of the light beam (return light) is illustrated at an upper left position in FIG. 1. As will be understood from the diagram, the HOE element 15 is divided into five regions 15a to 15e each having a predetermined hologram pattern. Specifically speaking, the HOE element 15 has the rectangular region 15e in its almost center portion and the trapezoidal regions 15a and 15b which face so as to sandwich the region 15e are arranged in both edge portions in its disk radial direction. The trapezoidal regions 15c and 15d which face so as to sandwich the region 15e are arranged in both edge portions in the direction which perpendicularly crosses the disk radial direction. As will be explained hereinafter, shapes and sizes of those five regions are defined so as to properly remove a DC offset and a local offset from the tracking error signal. That is, the regions 15a and 15b are defined so as to contain interference regions of the 0th order diffraction light and the ± first order diffraction light of the irradiation beam caused on the optical disk as much as possible. The regions 15c and 15d are defined so as not to contain the interference regions of the 0th order diffraction light and the ± first order diffraction light as much as possible but to contain only edge regions in the direction which perpendicularly crosses the disk radial direction of the return light. The region 15e is defined so as to contain only the almost center portion of the return light so that it does not contain the interference regions of the 0th order diffraction light and the ± first order diffraction light and the edge regions as much as possible. As mentioned above, the light beam which passes through the HOE element 15 is divided into 0th order light B0 which is not influenced by the hologram pattern and five first order light B1a to B1e which are respectively diffracted by the regions 15a to 15e. Each of those light passes through an individual optical path and is guided to a plurality of photosensing elements, which will be explained hereinafter, of the photodetector 17.

Subsequently, the structure of the photodetector 17 will be described with reference to FIG. 1. As illustrated in FIG. 1, the photodetector 17 has: a rectangular focusing photosensing portion FD for receiving the 0th order light B0 among the light beams divided by the HOE element 15, for producing a read signal, and for making focusing servo control; and a rectangular first photosensing portion TD1, a rectangular second photosensing portion TD2, and a rectangular third photosensing portion TD3 for receiving the five first order light B1a to B1e and for making tracking servo control. The focusing photosensing portion FD is divided into four portions in a cross-shaped form by a longitudinal division line f1a which is parallel with the radial direction of the disk and a lateral division line f1b which perpendicularly crosses the longitudinal division line f1a. The first photosensing portion TD1 is divided into two portions by a first division line t11 which perpendicularly crosses the radial direction of the disk. Similarly, the second photosensing portion TD2 is divided into two portions by a second division line t12 which perpendicularly crosses the radial direction of the disk. The third photosensing portion TD3 is divided into two portions by a third division line t13 which perpendicularly crosses the radial direction of the disk. It is not always necessary that each of those photosensing portions is uniformly divided into the two portions. This is because, for example, a proper output signal according to a light reception amount of each photosensing element, which will be explained hereinafter, can be adjusted by using correcting device or means (not shown) or the like.

Each photosensing element is provided for each of the divided regions of the focusing photosensing portion FD and the first to third photosensing portions TD1 to TD3. That is, for the focusing photosensing portion FD, photosensing elements FDa and FDc are provided at positions which are symmetrical with respect to a crossing point of the longitudinal division line f1a and the lateral division line f1b and photosensing elements FDb and FDd are provided at positions which are symmetrical with respect to the crossing point of the longitudinal division line f1a and the lateral division line f1b. For the first photosensing portion TD1, photosensing elements TD1a and TD1b are provided at positions which are symmetrical with respect to the first division line t11. For the second photosensing portion TD2, photosensing elements TD2a and TD2b are provided at positions which are symmetrical with respect to the second division line t12. For the third photosensing portion TD3, photosensing elements TD3a and TD3b are provided at positions which are symmetrical with respect to the third division line t13.

Subsequently, a relative positional relation of the HOE element 15 and the photodetector 17 will be described.

In the return light divided in the HOE element 15, since the 0th order light is a light beam which is not diffracted, it goes straight as it is in the HOE element 15 and is guided to the photodetector 17. Each of the five first order light moves along its diffracting direction and is guided to the photodetector 17. At this time, as shown in FIG. 1, the focusing photosensing portion FD is arranged at a position where the 0th order light forms a center of a spot B0' onto a crossing point of the longitudinal division line f1a and the lateral division line f1b. A read signal RF and a focusing error signal FE can be, thus, formed in accordance with output signals of the photosensing elements FDa to FDd.

Specifically speaking, when the output signals of the photosensing elements FDa to FDd are assumed to be Ifda to Ifdd, the read signal RF can be obtained by calculating the sum of the output signals Ifda to Ifdd as follows.

$$RF = Ifda + Ifdb + Ifdc + Ifdd \quad (1)$$

Since the astigmatism has been applied to the return light by the detecting lens 16 as mentioned above, the focusing error signal FE can be obtained by executing the following arithmetic operation by an astigmatism method.

$$FE = (Ifda + Ifdc) - (Ifdb + Ifdd) \quad (2)$$

The astigmatism can be applied to the light beam by, for example, constructing the detecting lens 16 as a multiple lens including a cylindrical lens.

The first photosensing portion TD1 is arranged at a position where when the objective lens is not moved, the first order light B1a and B1b form their spots B1a' and B1b' onto region surfaces of the photosensing elements TD1a and TD1b divided by the first division line t11. The second photosensing portion TD2 is arranged at a position where when the objective lens is not moved, the first order light B1c and B1d form their spots B1c' and B1d' onto region surfaces of the two photosensing elements TD2a and TD2b divided by the second division line t12 so that each of the region surfaces is occupied by the half area. Further, the third photosensing portion TD3 is arranged at a position where when the objective lens is not moved, the first order light B1e forms its spot B1e' onto region surfaces of the two photosensing elements TD3a and TD3b divided by the third division line t13 so that each of the region surfaces is occupied by the half area. A tracking error signal TE can be, thus, formed in accordance with output signals of the photosensing elements TD1a and TD1b, TD2a and TD2b, and TD3a and TD3b, respectively.

Specifically speaking, the tracking error signal TE can be formed by an improved push-pull method, which will be explained hereinbelow.

That is, as shown in FIG. 1, the second arithmetic operating circuit 20 has: a first displacement detecting device 21 for subtracting the output signal of the photosensing element TD1b from the output signal of the photosensing element TD1a and detecting a relative displacement in the radial direction between the light spot position on the disk and the track center; a second displacement detecting device 22 for subtracting the output signal of the photosensing element TD2b from the output signal of the photosensing element TD2a and detecting a displacement of the objective lens 14 in the radial direction of the disk; a third displacement detecting device 23 for subtracting the output signal of the photosensing element TD3b from the output signal of the photosensing element TD3a and detecting a local offset at the light spot position on the disk; a first amplifying device 24 for weighting an output signal of the second displacement detecting device 22; a second amplifying device 25 for weighting an output signal of the third displacement detecting device 23; a DC offset correcting device 26 for subtracting an output of the first amplifying device 24 from an output of the first displacement detecting device 21 and correcting a DC offset of the tracking error signal; and a local offset correcting device 27 for subtracting an output of the second amplifying device 25 from an output of the DC offset correcting device 26 and correcting a local offset of the tracking error signal. Weight coefficients of the first amplifying device 24 and the second amplifying device 25 are set to K1 and K2, respectively, and their values are adjusted by the coefficient adjusting device 30 each time the optical pickup apparatus 100 is activated. By the above construction, assuming that the output signals of the photosensing elements TD1a and TD1b, TD2a and TD2b, and TD3a and TD3b are set to Itd1a and Itd1b, Itd2a and Itd2b, and Itd3a and Itd3b, respectively, the tracking error signal TE can be obtained by executing the following arithmetic operation by a push-pull method.

$$TE = (Itd1a - Itd1b) - K1 \times (Itd2a - Itd2b) - K2 \times (Itd3a - Itd3b) \quad (3)$$

Subsequently, the operation for removing the DC offset and the local offset from the tracking error signal by the tracking servo control system mentioned above will be described.

Figure 2:
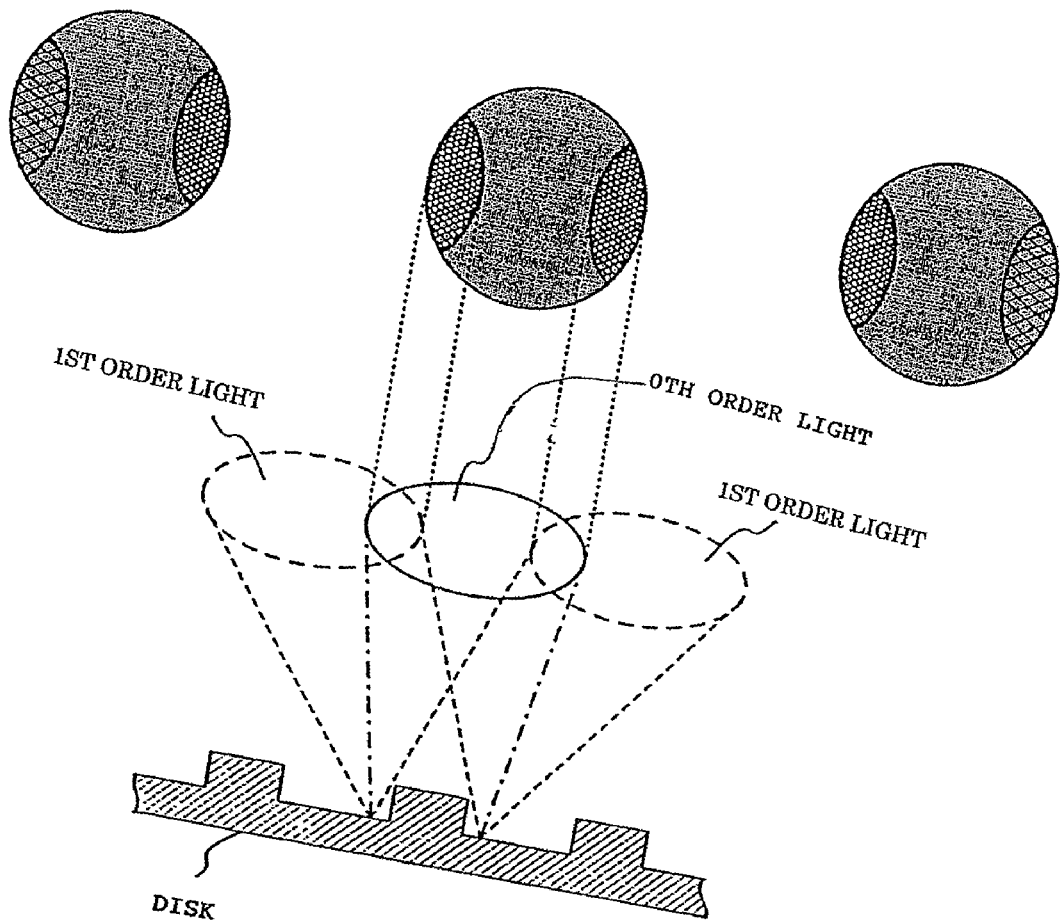
FIG. 2 is a diagram showing a principle of a push-pull method.

Tracks (grooves and pit train) periodically arranged exist on an information recording surface of the optical disk. The light beam irradiated onto the information recording surface is diffracted by its periodic structure. That is, when the light beam is converged by the objective lens 14 and the spot is irradiated onto the surface of the optical disk, in addition to the 0th order light which is reflected in the same direction as that of the incident light, a plurality of diffraction light (± first order, ± second order, . . . ) occur in the radial direction. Since diffraction angles of the diffraction light are determined by a relation between a spot diameter and a track pitch, they are always set to the same diffraction angle on the information recording surface where the same track pitch is repeated. Among the plurality of diffraction light which occurred as mentioned above, only the diffraction light which passes through the pupil of the objective lens 14 is detected by the photodetector 17. Generally, in a high density optical disk such as DVD or BD, since the track pitch is set to a small value, the light which overlaps (interferes with) the 0th order light in the pupil is up to the ± first order light as shown in FIG. 2A and the ± second order light and the subsequent light are cut off by the pupil.

Ordinarily, since the reflecting directions of the 0th order light and the ± first order light differ, phases of the light waves are deviated. If the beam irradiating positions are symmetrical positions with respect to the track center, since a phase deviation amount of the +first order light from the 0th order light and a phase deviation amount of the − first order light from the 0th order light are equal, the brightness/darkness of the right interference region and the brightness/darkness of the left interference region in what is called a baseball pattern (hereinbelow, called an interference pattern) where the light passes through the pupil of the objective lens 14 are equal as shown in FIG. 2C. If the beam irradiating positions are asymmetrical with respect to the track center, however, a difference occurs between them, so that a difference occurs between the brightness/darkness of the right and left interference regions in the interference pattern as shown in FIGS. 2B and 2D. In the embodiment, the difference between the brightness/darkness of the right and left interference regions is detected in the first photosensing portion TD1 of the photodetector 17, thereby forming the push-pull tracking error signal.

When the center of the objective lens 14 coincides with an optical axis of the light beam, since the light spots which are formed in the photosensing portion TD1 are symmetrical with respect to the first division line t11, what is called a far field tracking error signal in a sine-wave shape in which the 0 level is set to the center is obtained from a difference signal which is generated from the first displacement detecting device 21. According to the push-pull method, however, since only the objective lens 14 is deflected in the direction which perpendicularly crosses the optical axis in order to return the beam irradiating positions deviated from the track center to the track center, in addition to the tracking error signal, the DC offset corresponding to the displacement of the objective lens 14 from the optical axis of the light beam has been multiplexed to the difference signal which is generated from the first displacement detecting device 21.

In order to remove the DC offset, therefore, the output signal from the second displacement detecting device 22 which generates only the DC offset corresponding to the displacement of the objective lens 14 from the optical axis of the light beam is used. That is, since the regions 15c and 15d of the HOE element 15 have been defined in such a manner that the interference portions of the 0th order light and the + first order light which are caused by the diffraction on the recording surface of the disk are not included as much as possible in the light beam which passes there and they are largely changed in accordance only with the movement in the radial direction of the objective lens 14, no tracking error signal is included in a difference signal of the photosensing elements TD2a and TD2b where the light beam portions which pass through the regions 15c and 15d enter, but only the DC offset of the same phase as that of the DC offset multiplexed to the difference signal which is generated from the first displacement detecting device 21 is included. A proper weight is added, therefore, to the difference signal which is generated from the second displacement detecting device 22 by the first amplifying device 24, thereby forming a DC offset correction signal. In the DC offset correcting device 26, by subtracting the DC offset correction signal from the difference signal which is generated from the first displacement detecting device 21, the tracking error signal which is not always accompanied with the DC offset irrespective of the displacement of the objective lens 14 from the optical axis of the light beam can be formed.

Although the maximum phase deviation amount between the 0th order light and the ± first order light depends on a groove depth in an unrecorded region, it depends on not only the groove depth but also reflecting characteristics of a recorded mark portion in a recorded region. In the case where the light beam converged by the objective lens 14 formed the spot in a boundary portion between the unrecorded region and the recorded region, therefore, an offset which is caused in the boundary portion between the unrecorded region and the recorded region, that is, a local offset is multiplexed to an output signal from the DC offset correcting device 26 mentioned above.

In the embodiment, therefore, the local offset is removed by using an output signal from the third displacement detecting device 23 in which an influence by the local offset appears. In the boundary region between the unrecorded region and the recorded region, the diffraction due to the track structure as mentioned above and the diffraction due to the change in step-like reflecting characteristics (reflection amplitude characteristics and reflection phase characteristics) occur simultaneously as mentioned above. As for the diffraction due to the track structure, it is sufficient to consider up to the ± first order light as mentioned above. As for the diffraction due to the change in reflecting characteristics, however, a diffraction angle is very small and up to the fairly high-order diffraction light has to be considered. Since diffraction efficiency at that time depends on recording mark characteristics, it cannot be described by a simple principle like a push-pull signal in the non-boundary portion as mentioned above. In this instance, therefore, a computer simulation is used in order to estimate the local offset.

The recording mark characteristics will now be described hereinbelow. Generally, in a WORM type optical disk such as DVD-R or BD-R or a rewritable type optical disk such as DVD-RW or BD-RE, a recording film is formed on a substrate on which a groove structure has previously been formed. The recording film has been designed so that when it absorbs heat of a predetermined amount or more that is caused by the laser beam, optical characteristics or a physical shape changes. That is, data to be recorded is recorded onto the optical disk as a change in optical characteristics or physical shape due to a modulation of a laser power. The optical characteristics denote two characteristics such as reflectance characteristics and phase characteristics. Generally, the reflectance characteristics are expressed by a reflectance ratio in a recording mark portion and a non-mark portion. The phase characteristics are expressed by a phase difference of the light waves which are reflected by the recording mark portion and the non-mark portion. Since the change in physical shape on the substrate appears as a change in phase characteristics, only the two changes such as change in reflectance characteristics and change in phase characteristics will be examined in the following description.

Ordinarily, the recording film is designed by laminating a plurality of different materials into a multilayer structure. What kinds of materials are used to form the multilayer structure by which combination can be freely decided by a disk maker. It is, however, necessary that a signal modulation degree in the case where the data has been recorded/reproduced satisfies the disk standard. On the contrary, so long as the signal modulation degree is satisfied, the recording mark may be formed either as a change in reflectance characteristics or as a change in phase characteristics. In the disks actually existing in the market, it is presumed that the change in reflectance characteristics and the change in phase characteristics are preferably combined.

With respect to each of the following typical two types of disks A and B, therefore, a diffraction pattern in the boundary portion between the recorded region and the unrecorded region has been examined. That is, the disk A is a disk of a type in which the recording mark is formed only by the change in reflectance characteristics and the disk B is a disk of a type in which the recording mark is formed only by the change in phase characteristics.

The signal modulation degrees of the disks A and B are equal and, further, the following parameter values are also equal.

(NA, λ)=(0.85, 405 nm)

(TP, recording mark length)=(320 nm, 224 nm)

(Groove depth, groove width)=(25 nm, 160 nm)

Results obtained by comparing the diffraction patterns of the disks A and B are shown in FIGS. 3A and 3B. FIG. 3A shows the result of the disk A and FIG. 3B shows the result of the disk B here. In both of FIGS. 3A and 3B, an axis of abscissa indicates a value obtained by normalizing coordinates in the pupil radial direction of the objective lens 14 and an axis of ordinate indicates intensity distribution of the light beam at the radial cross section of the objective lens 14. As will be understood from FIGS. 3A and 3B, in both of the disks A and B, in each of the unrecorded portion and the recorded portion, the diffraction pattern is bilaterally symmetrical with respect to the center of the optical axis. In the boundary portion between the recorded region and the unrecorded region, in spite of the fact that the light beam has been irradiated so that the spot center of the irradiation beam coincides with the track center, the diffraction pattern is not bilaterally symmetrical with respect to the track center and the intensity distribution on the right side and that on the left side differ largely. In other words, this means that the local offset occurs in the boundary portion between the recorded region and the unrecorded region. It is important here that asymmetrical forms in the disks A and B are different. That is, in the disk A shown in FIG. 3A, the intensity on the left side is larger than that on the right side in any of the interference regions of the 0th order light and the ± first order light and the region of only the 0th order light. In the disk B shown in FIG. 3B, however, the intensity on the left side and the intensity on the right side in the interference regions of the 0th order light and the ± first order light and those in the region of only the 0th order light are in a mutually opposite relation.

It will be, consequently, understood that although there is a possibility that the local offset can be cancelled only by the DC offset correcting device 26 by properly setting the division patterns of the HOE element 15 for the disk A, the local offset cannot be cancelled unless the local offset correcting device 27 is used for the disk B.

FIG. 4 illustrates graphs each showing relations among values of K1 and K2 in the foregoing tracking error arithmetic operating equation (3) and the DC offset and the local offset in a state where the objective lens 14 has been moved in the radial direction by 10%. FIGS. 4A and 4B are the graphs regarding the disk A. FIGS. 4C and 4D are the graphs regarding the disk B. In FIGS. 4A-4D, the DC offset is an average level of a peak value and a bottom value in the recorded region and the local offset is an average level of a peak value and a bottom value in the boundary portion between the recorded region and the unrecorded region. An axis of ordinate indicates a value obtained by normalizing the value of each offset by an amplitude of the push-pull signal. FIGS. 4A and 4C are the graphs showing the values of the DC offset and the local offset measured while changing the value of K1 in a state of K2=0. As will be understood from FIG. 4A, in the disk A, there is a value of K1 at which the DC offset and the local offset are almost simultaneously equal to zero. As will be understood from FIG. 4C, in the disk B, K1 adapted to set both of the offsets to be almost simultaneously equal to zero does not exist and they differ largely. It means that the local offset cannot be cancelled if only the DC offset correcting device 26 is used for the disk B as mentioned above.

FIGS. 4B and 4D are the graphs showing the values of the DC offset and the local offset measured while changing the value of K2 in a state where after the value of K1 has been optimized so that the DC offset is equal to zero, it has been fixed. In any of those disks, a state where a magnitude of the local offset changes while keeping the DC offset at almost zero in accordance with the change in K2 will be understood. It will be understood that the local offset can be set to almost zero by setting K2 to −15 or less for the disk B. Actually, if the value of the local offset is equal to about ⅓ or less of the amplitude of the push-pull signal, since the sufficiently stable tracking error signal can be obtained, the value of K2 may be set to −5.

From the above results, when executing the arithmetic operating equation (3), first, by setting K2=0 and optimizing K1 while monitoring the DC offset and, thereafter, optimizing K2, both of K1 and K2 can be set to the optimum values.

When K2=0 is set and K1 is optimized here, the value of K1 ought to satisfy a relation of K1={DC offset of (Itd1$a$−Itd1$b$)}/{DC offset of (Itd2$a$−Itd2$b$)}. That is, after the value of K1 has been optimized, since {DC offset of (Itd1$a$−Itd1$b$)}=K1×{DC offset of (Itd2$a$−Itd2$b$)} is always satisfied, the DC offset of the whole tracking error signal ought to be equal to K2×{DC offset of (Itd3$a$−Itd3$b$)}. Since the value of K2 is optimized while monitoring a magnitude of the local offset, although there is not a guarantee in which a value of K2×{DC offset of (Itd3$a$−Itd3$b$)} is certainly equal to a small value, if the inherent value of {DC offset of (Itd3$a$−Itd3$b$)} is small to a certain extent, even after the value of K2 has been optimized, the value of K2×{DC offset of (Itd3$a$−Itd3$b$)} can be suppressed to a small value. On the contrary, after K2 has been optimized, if the DC offset exceeds the inherent DC offset, that is, the magnitude of {DC offset of (Itd1$a$−Itd1$b$)}, the meaning of using such a method grows thin. It is, therefore, desirable to satisfy the following expression.

$$|K2\times\{DC \text{ offset of } (Itd3a-Itd3b)\}|\leq|DC \text{ offset of } (Itd1a-Itd1b)| \qquad (4)$$

That is, it is preferable that the DC offset included in {DC offset of (Itd3$a$−Itd3$b$)} is as small as possible. It is preferable that the DC offset of {DC offset of (Itd2$a$−Itd2$b$)} has a magnitude of a certain extent because it is used to cancel the DC offset of {DC offset of (Itd1$a$−Itd1$b$)}. It is also preferable that both of {DC offset of (Itd2$a$−Itd2$b$)} and {DC offset of (Itd3$a$−Itd3$b$)} do not include the push-pull signal as much as possible.

In the case of FIG. 4D, since the value of K2 may be equal to −5, it is necessary that the DC offset included in (Itd3$a$−Itd3$b$) is equal to ⅕ or less of the DC offset included in (Itd1$a$−Itd1$b$). Since the DC offset included in (Itd2$a$−Itd2$b$) needs a magnitude of a certain extent, for example, it is preferable that it is set to ⅕ or more of the DC offset included in (Itd1$a$−Itd1$b$).

Figure 6:
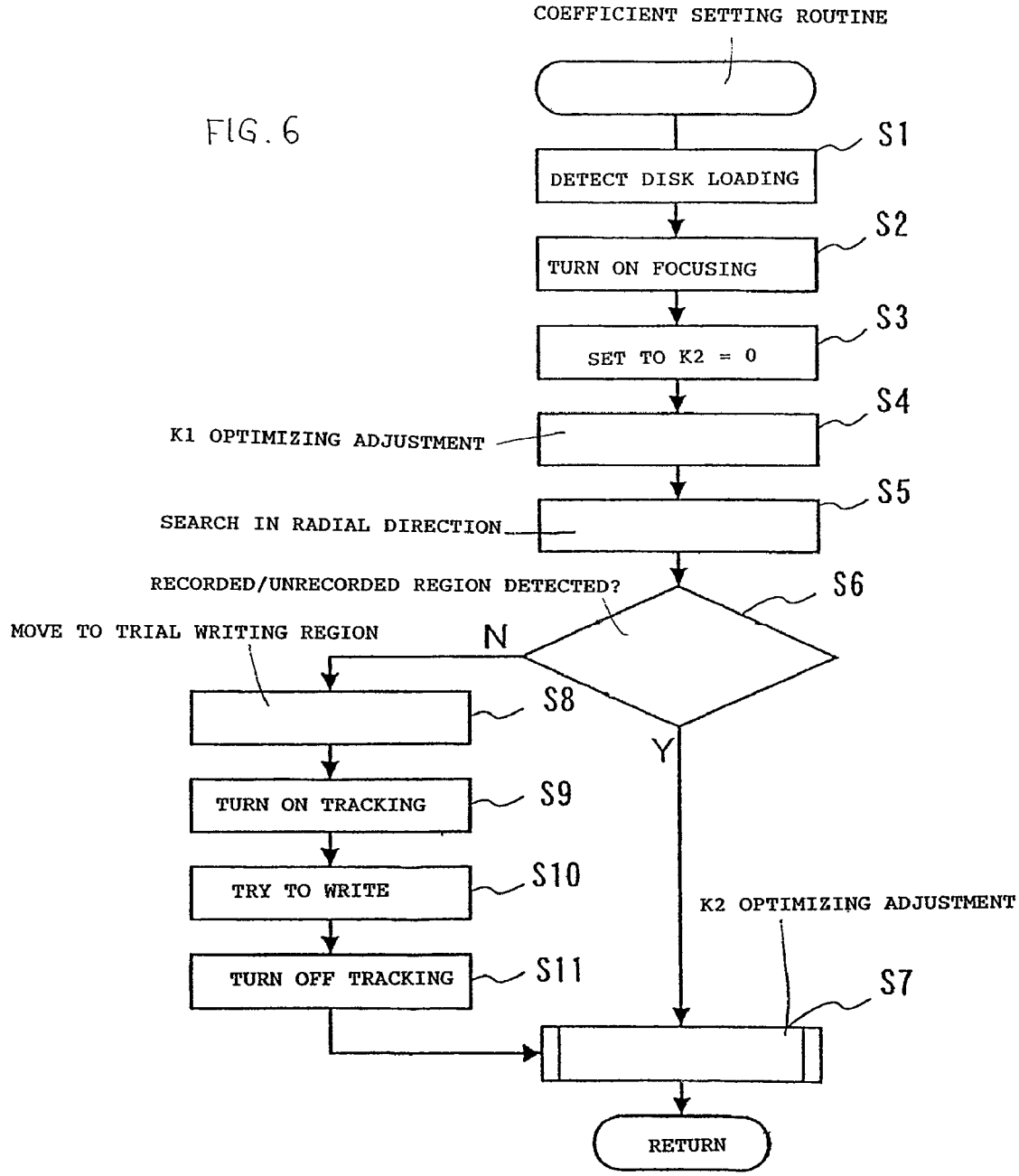
FIG. 6 is a flowchart showing a main operating routine according to the invention.
Figure 7:
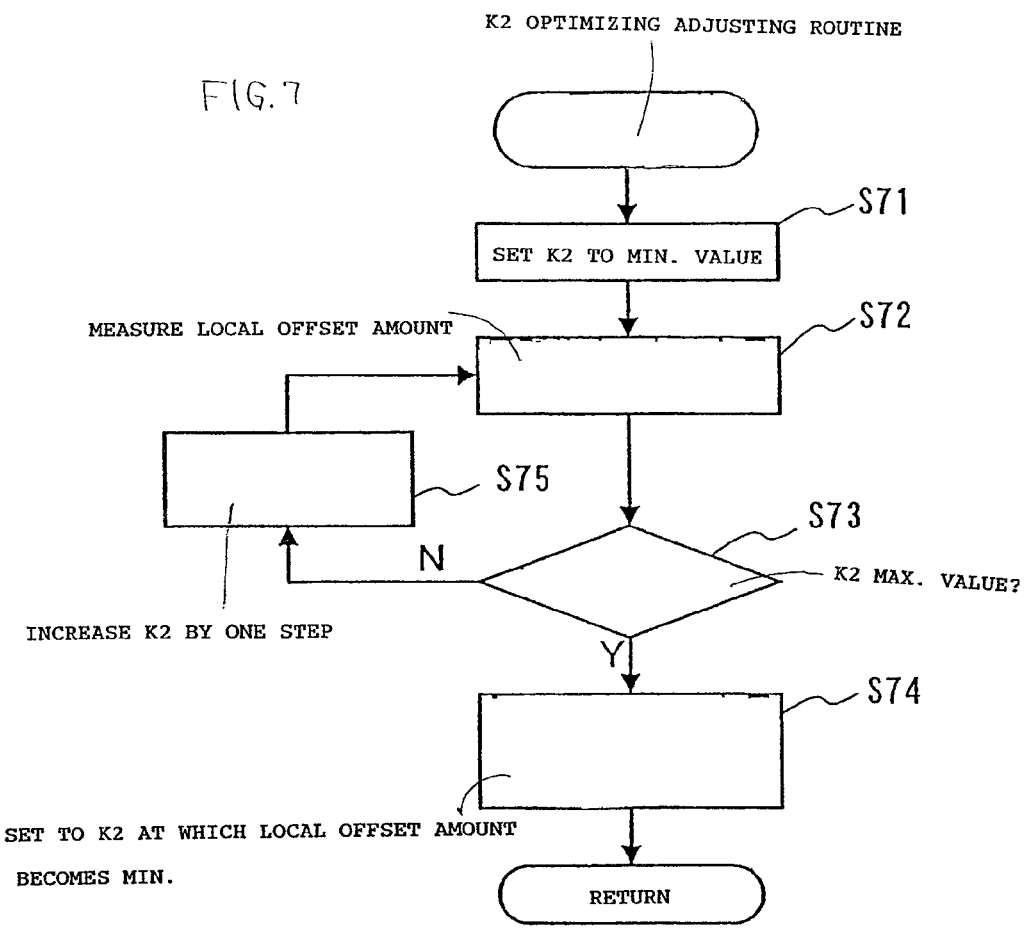
FIG. 7 is a flowchart showing an optimizing routine of a value of the coefficient K2 in the arithmetic operating circuit in the invention.

Subsequently, a coefficient setting method of the pickup apparatus in the embodiment of the invention will be described with reference to flowcharts of FIGS. 6 and 7.

First, when it is detected by a switch (not shown) that the disk has been loaded (step S1), a spindle motor rotates and a focusing servo is locked (step S2). At this time, various kinds of parameters such as a focusing offset are adjusted. Subsequently, the value of K2 is set to zero (step S3). The third item of the right side of the tracking error arithmetic operating equation (3) is eliminated as shown by the following equation.

$$TE=(Itd1a-Itd1b)-K1\times(Itd2a-Itd2b) \qquad (5)$$

First, an optimum value of K1 is obtained in this state (step S4). That is, a sine wave in which the DC offset has been multiplexed to the difference signal which is generated from the first displacement detecting device 21 is obtained. A phase of the sine wave changes by 360° here each time the objective lens 14 is deflected by a distance of one track. Since the multiplexed DC offset changes according to the change in K1 value, by deflecting the objective lens 14 by a predetermined width in each of the predetermined number of K1 values, the optimum K1 value at which the DC offset is substantially set to zero can be obtained.

Subsequently, the boundary portion between the recorded region and the unrecorded region is decided by moving a pickup in the radial direction (step S5). At this time, the boundary portion can be found out by using a fact that a DC level of the RF signal in the recorded region and that in the unrecorded region differ. When the boundary portion between the recorded region and the unrecorded region is not found (step S6), the pickup is moved to what is called a trial writing region provided on the disk (step S8). The tracking is turned on (step S9). The proper data is recorded (step S10). After that, the tracking is turned off again (step S1). The boundary portion between the recorded region and the unrecorded region, thus, can be decided. After completion of the decision of the boundary portion, K2 is optimized (step S7). Specifically speaking, first, K2 is set to the minimum value within a predetermined range (step S71). In this state, a magnitude of the local offset is measured (step S72). As a measuring method of the local offset, for example, a peak holding method can be used. That is, the objective lens 14 is deflected by a predetermined amount toward the inner and outer rim directions of the disk, respectively. In this instance, by adding the peak value and the bottom value of the signal which is generated from the local offset correcting device 27 and dividing an addition result by 2, the local offset can be obtained. When the local offset at the time when the value of K2 is the minimum value is obtained, the value of K2 is increased by one step (step S75). The magnitude of the local offset is obtained again. In this manner, the magnitude of the local offset is obtained while gradually increasing the value of K2. When K2 is equal to the maximum value within the predetermined range (step S73), the value of K2 at the time when the local offset is minimum for a time interval so far is set as an optimum value (step S74). The minimum value and the maximum value within the predetermined range which specifies a variable range of K2 can be estimated by preliminarily examining the optimum values of K2 for a plurality of disks having a possibility that they will be put into the market.

By the above operations, the optimum values of K1 and K2 which can remove the DC offset and the local offset can be easily and certainly obtained even for the various kinds of optical disks.

Although the astigmatism method has been used for detection of the focusing error signal in the embodiment of the invention mentioned above, the focusing error signal can be also detected by using another method such as a spot size method. Although the tracking error signal has been formed by using the first order light emitted by the HOE element 15 in the embodiment of the invention, the tracking error signal can be also formed by using the 0th order light in place of the first order light. Further, although the 0th order light of the HOE element 15 has been used for focusing in the embodiment of the invention, after the light for focusing and the light for tracking were divided by using a half mirror, only the light for tracking may be divided by the HOE element 15. Further, although the tracking error signal has been formed by the 6-split photodetector 17 after the first order light has been divided into five light by the HOE element 15 in the embodiment of the invention, as will be explained hereinafter, it is also possible to construct in such a manner that the light is merely divided into the 0th order light and the first order light by the HOE element 15 and by properly arranging a plurality of photosensing elements having various kinds of shapes and sizes, division patterns similar to those in the embodiment mentioned above are obtained. Although the values of K1 and K2 are adjusted each time the optical disk has been loaded in the embodiment, for example, it is also possible to construct in such a manner that by providing a change-over switch, only K1 is adjusted, only K2 is adjusted, or both of K1 and K2 are not adjusted.

Figure 5:
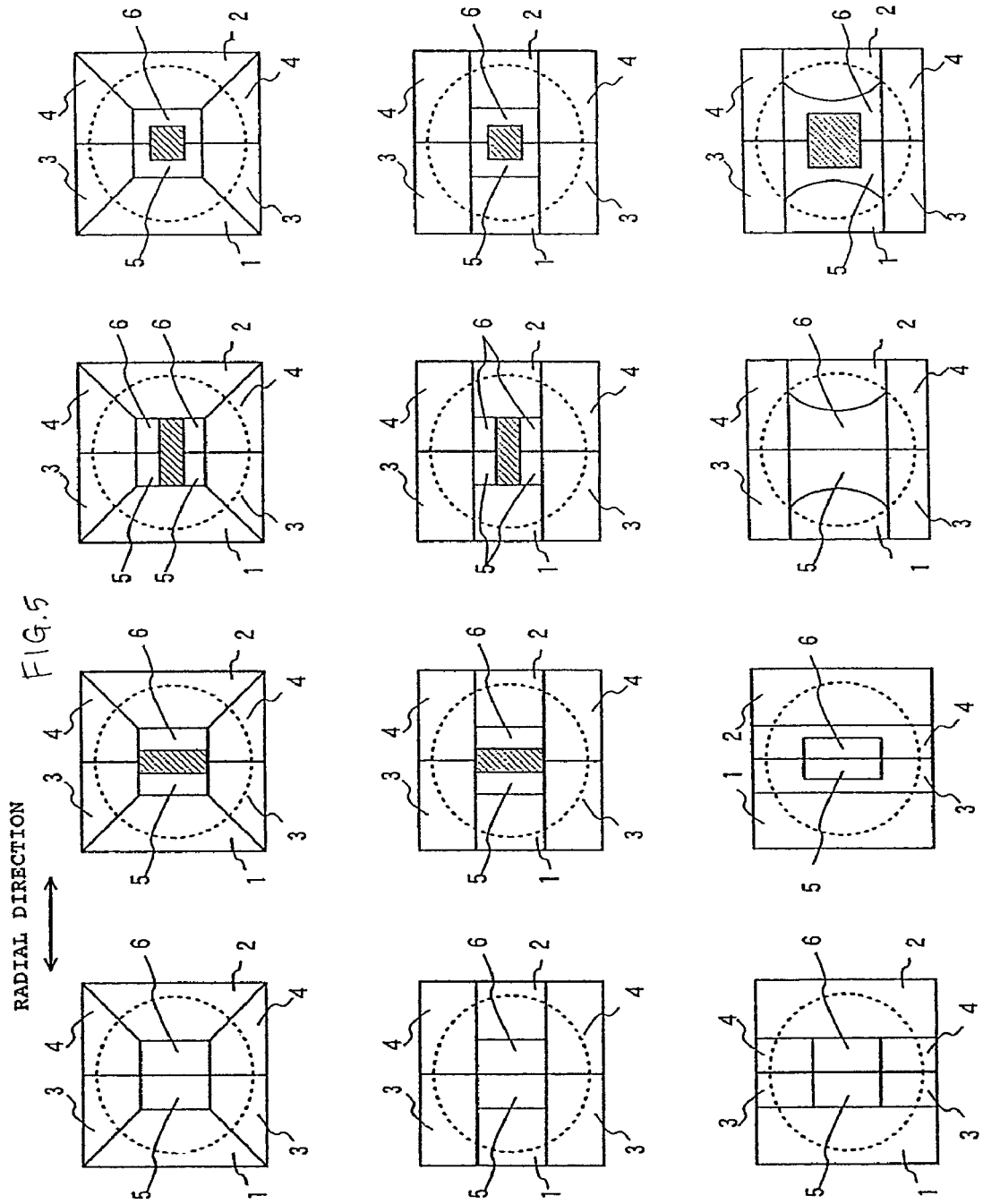
FIG. 5 is a plan view showing a substitution example of a division pattern of the divisional photosensing device in the invention.

Further, the division patterns which are formed by the HOE element 15 and the photodetector 17 are not limited to a pattern as shown in FIG. 5A used in the embodiment. That is, any patterns may be provided so long as the apparatus is constructed in such a manner that the push-pull signal is included as much as possible in the difference signal which is generated from the first displacement detecting device 21, the push-pull signal is not included as much as possible in the difference signal which is generated from the second displacement detecting device 22 but the signal which changes largely in accordance with the movement of the objective lens 14 is included, and the push-pull signal is not included as much as possible in the difference signal which is generated from the third displacement detecting device 23 but the signal which hardly changes in accordance with the movement of the objective lens is included. For example, patterns as shown in FIGS. 5B-5L may be provided. The division patterns as shown in FIGS. 5A-5L can be realized by properly forming each of the division patterns in the HOE element 15 and/or the photodetector 17. For example, besides the embodiment mentioned above, the pattern of FIG. 5A can be also realized by using an HOE element 15' and the photodetector 17 as shown in an optical pickup apparatus 100' in an embodiment shown in FIG. 8. As mentioned above, the pattern can be also realized by using an HOE element 15" for executing only the division of the 0th order light and the first order light and a photodetector 17' for executing the division and reception of all of the other light as shown in an optical pickup apparatus 100" in an embodiment shown in FIG. 9.

Figure 8:
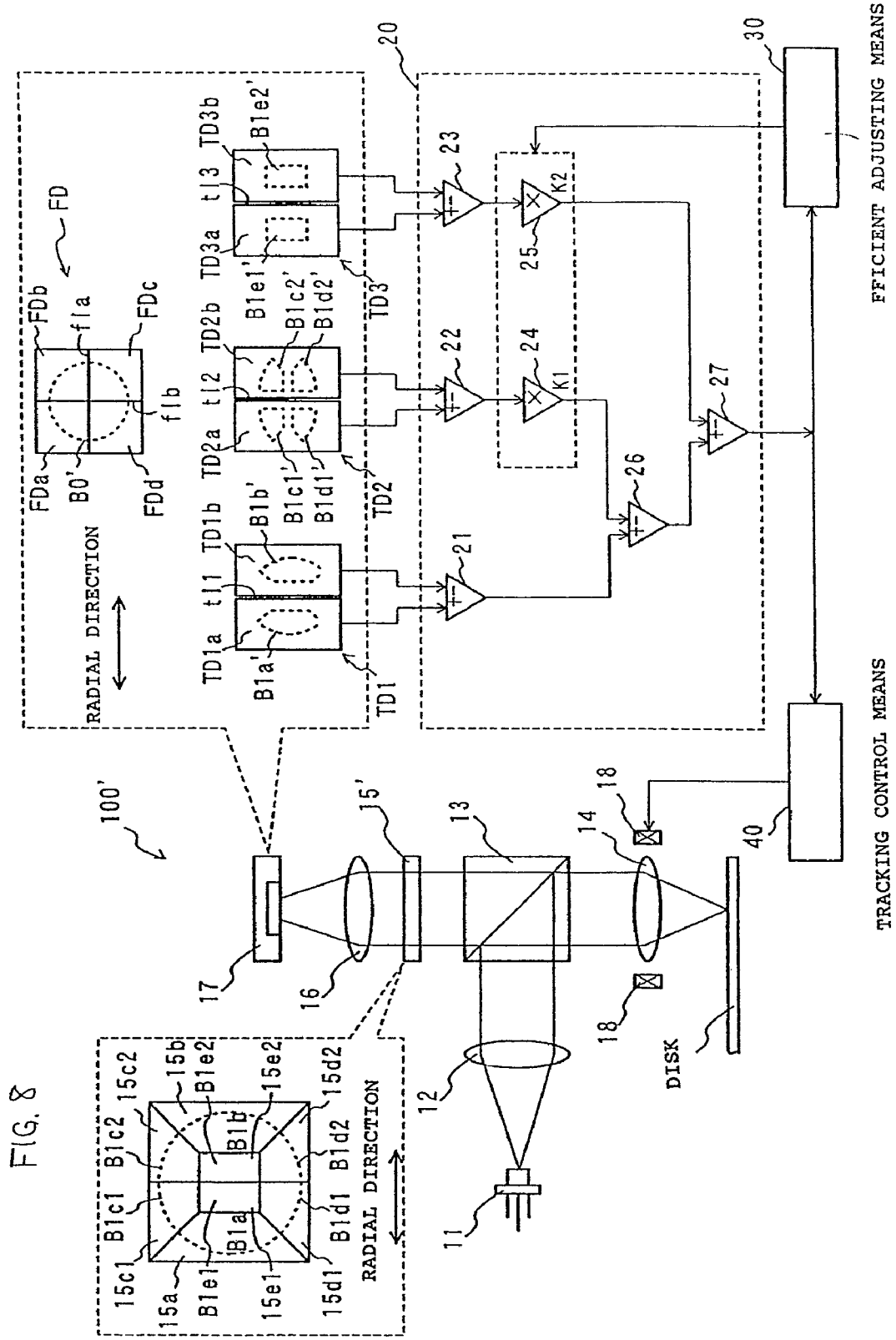
FIG. 8 is a block diagram showing a construction of an optical pickup apparatus of a substitution example of the invention.

In the HOE element 15' shown in FIG. 8, the rectangular region 15e in the almost center portion in the HOE element 15 in FIG. 1 is divided into two regions 15e1 and 15e2 in the disk radial direction. Further, the trapezoidal regions 15c and 15d shown in FIG. 1 are also divided into two regions 15c1 and 15c2 and two regions 15d1 and 15d2 in the disk radial direction, respectively. The return light which enters the HOE element 15' is, thus, divided into eight light by the eight regions having a predetermined hologram pattern. In the second photosensing portion TD2 of the photodetector 17, when the objective lens is not moved, spots B1c1' and B1c2' and spots B1d1' and B1d2' of first order light B1c1 and B1c2 and first order light B1d1 and B1d2 are formed onto region surfaces of the two photosensing elements TD2a and TD2b divided by the second division line t12, respectively. Further, in the third photosensing portion TD3, when the objective lens is not moved, spots B1e1' and B1e2' of first order light B1e1 and B1e2 are formed onto region surfaces of the two photosensing elements TD3a and TD3b divided by the third division line t13, respectively.

Figure 9:
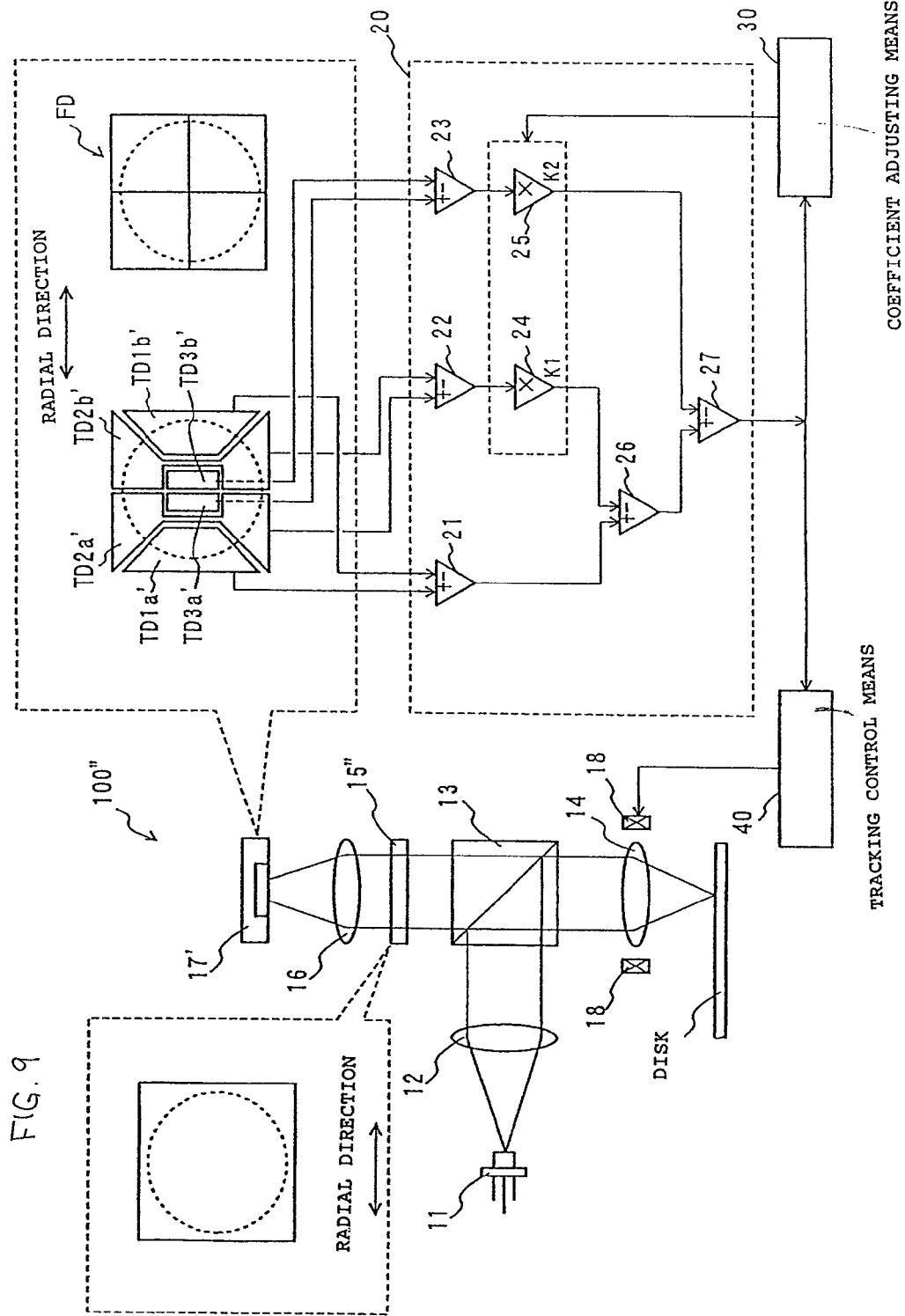
FIG. 9 is a block diagram showing a construction of an optical pickup apparatus of a substitution example of the invention.

The HOE element 15" shown in FIG. 9 is constructed so as to execute only the division of the 0th order light and the first order light. In order to execute the division and reception of the other light, the photodetector 17' is constituted by: a first photosensing portion formed by photosensing elements TD1a' and TD1b' for dividing regions including both edge portions in the radial direction of the disk and receiving the light; a second photosensing portion formed by photosensing elements TD2a' and TD2b' for dividing regions including both edge portions in the direction which perpendicularly crosses the radial direction of the disk and receiving the light; and a third photosensing portion formed by photosensing elements TD3a' and TD3b' for dividing regions including almost the center portion and receiving the light.

In FIGS. 5A-5L, reference numeral 1 denotes a region for generating the signal Itd1a; 2 a region for generating the signal Itd1b; 3 a region for generating a signal Itd2a; 4 a region for generating a signal Itd2b; 5 a region for generating a signal Itd3a; and 6 a region for generating a signal Itd3b. A hatched portion shown in each of FIGS. 5B-5D, FIGS. 5F-5H, and FIG. 5L denotes that it is not used to form the tracking signal. Although this process can be realized by, for example, inserting a shielding plate into a detection optical path, in order to suppress an influence on the light for RF and the light for focusing, for example, it is more preferable to guide only the first order light in the region to another direction by the HOE element 15, for example.

What is claimed is:

1. An optical pickup apparatus for reading an information signal recorded on a recording surface of an optical disk along a track by projecting a light beam, comprising:

an objective lens for converging said light beam onto said recording surface; an objective lens moving device for moving said objective lens in a radial direction of said optical disk; and a divisional photosensing device for receiving return light reflected by said optical disk in a plurality of divided regions, wherein said divisional photosensing device comprises: a first divisional photosensing device for receiving a first region including both edge portions in said radial direction of said return light, in two divided areas in said radial direction; a second divisional photosensing device for receiving a second region including both edge portions in a direction which perpendicularly crosses said radial direction of said return light, in two divided areas in said radial direction; and a third divisional photosensing device for receiving a third region including an almost center portion of said return light, in two divided areas in said radial direction, said optical pickup apparatus further comprising:

a tracking error detecting device for arithmetically operating an output signal from said first divisional photosensing device and detecting a relative displacement between said track and the light beam converged onto said recording surface;

an objective lens displacement detecting device for arithmetically operating an output signal from said second divisional photosensing device and detecting a displacement of said objective lens;

a local offset detecting device for arithmetically operating an output signal from said third divisional photosensing device and detecting a local offset;

a first amplifying device for applying a predetermined weight to an output signal from said objective lens displacement detecting device;

a second amplifying device for applying a predetermined weight to an output signal from said local offset detecting device;

DC offset correcting device for subtracting an output signal from said first amplifying device from an output signal from said tracking error detecting device and correcting a DC offset; and a local offset correcting device for subtracting an output signal from said second amplifying device from an output signal from said DC offset correcting device and correcting a local offset.

2. An optical pickup apparatus according to claim 1, wherein said first divisional photosensing device comprises a first photosensing portion having two photosensing surfaces and a first light flux dividing device arranged between said objective lens and said first photosensing portion, said first region is divided by said first light flux dividing device, said first region is divided into two regions in said radial direction by said first light flux dividing device or said first photosensing portion, and said first region divided into the two regions is received by the two photosensing surfaces of said first photosensing portion, respectively.

3. An optical pickup apparatus according to claim 1, wherein said second divisional photosensing device comprises a second photosensing portion having two photosensing surfaces and a second light flux dividing device arranged between said objective lens and said second photosensing portion, said second region is divided by said second light flux dividing device, said second region is divided into two regions in said radial direction by said second light flux dividing device or said second photosensing portion, and said second region divided into the two regions is received by the two photosensing surfaces of said second photosensing portion, respectively.

4. An optical pickup apparatus according to claim 1, wherein said third divisional photosensing device comprises a third photosensing portion having two photosensing surfaces and a third light flux dividing device arranged between said objective lens and said third photosensing portion, said third region is divided by said third light flux dividing device, said third region is divided into two regions in said radial direction by said third light flux dividing device or said third photosensing portion, and said third region divided into the two regions is light-received by the two photosensing surfaces of said third photosensing portion, respectively.

5. An optical pickup apparatus according to claim 1, wherein
said first divisional photosensing device has a first photosensing portion having two photosensing surfaces so as to receive said first region, in two divided areas in said radial direction,
said second divisional photosensing device has a second photosensing portion having two photosensing surfaces so as to receive said second region, in two divided areas in said radial direction, and
said third divisional photosensing device has a third photosensing portion having two photosensing surfaces so as to receive said third region, in two divided areas in said radial direction.

6. An optical pickup apparatus according to claim 2, characterized in that said light flux dividing device is a hologram optical element.

7. An optical pickup apparatus according to claim 1, wherein each time the optical disk is loaded, said optical pickup apparatus automatically executes the weighting process of said first amplifying device and the weighting process of said second amplifying device.

8. An optical pickup apparatus according to claim 3, characterized in that said light flux dividing device is a hologram optical element.

9. An optical pickup apparatus according to claim 4, characterized in that said light flux dividing device is a hologram optical element.

* * * * *